(12) United States Patent
Rimi

(10) Patent No.: US 8,540,031 B2
(45) Date of Patent: Sep. 24, 2013

(54) ENCAPSULATING DEVICE

(76) Inventor: Michael Rimi, East Moriches, NY (US)

( * ) Notice: Subject to any disclaimer, the term of this patent is extended or adjusted under 35 U.S.C. 154(b) by 365 days.

(21) Appl. No.: 12/981,005

(22) Filed: Dec. 29, 2010

(65) Prior Publication Data

US 2012/0167365 A1   Jul. 5, 2012

(51) Int. Cl.
*E21B 7/12* (2006.01)

(52) U.S. Cl.
USPC ............ 166/364; 166/360; 166/363; 166/344

(58) Field of Classification Search
USPC ................. 166/338, 344, 351, 360, 363, 364, 166/378–380, 85.4, 302, 57, 92.1, 93.1; 285/373, 419
See application file for complete search history.

(56) References Cited

U.S. PATENT DOCUMENTS

| | | | | |
|---|---|---|---|---|
| 1,789,771 A * | 1/1931 | Peppard | ................... | 285/123.11 |
| 3,851,491 A * | 12/1974 | Mason | ........................... | 405/188 |
| 4,050,720 A * | 9/1977 | Reneau | ........................... | 285/18 |
| 4,423,774 A * | 1/1984 | Mefford | ..................... | 166/77.51 |
| 4,568,220 A * | 2/1986 | Hickey | ............................ | 405/60 |
| 4,613,161 A * | 9/1986 | Brisco | .............................. | 285/18 |
| 4,708,373 A * | 11/1987 | Morriss, Jr. | ............... | 285/133.21 |
| 5,004,275 A * | 4/1991 | Miller | ............................ | 285/373 |
| 5,040,828 A * | 8/1991 | Kane | .............................. | 285/197 |
| 5,234,234 A * | 8/1993 | Hearn | ............................ | 285/328 |
| 5,280,823 A | 1/1994 | Chabot | | |
| 5,358,286 A * | 10/1994 | Eaton et al. | .................... | 285/197 |
| 5,443,096 A * | 8/1995 | King | .............................. | 138/99 |
| 5,590,913 A * | 1/1997 | Morris et al. | ................... | 285/18 |
| 6,962,205 B1 | 11/2005 | Lay, Jr. | | |
| 7,308,933 B1 * | 12/2007 | Mayfield et al. | ............. | 166/85.1 |
| 7,448,456 B2 * | 11/2008 | Shahin et al. | ................. | 175/423 |
| 7,581,564 B2 * | 9/2009 | Tanaka et al. | ................. | 138/110 |
| 2004/0227347 A1 * | 11/2004 | Fundin et al. | ................. | 285/419 |
| 2007/0137866 A1 * | 6/2007 | Ravensbergen et al. | ....... | 166/384 |
| 2008/0029270 A1 * | 2/2008 | Wong et al. | ..................... | 166/338 |
| 2009/0050328 A1 * | 2/2009 | Bath et al. | ...................... | 166/338 |
| 2010/0059990 A1 * | 3/2010 | Avery et al. | .................... | 285/197 |
| 2010/0314128 A1 * | 12/2010 | Cline | ............................. | 166/379 |
| 2012/0090850 A1 * | 4/2012 | Botich | ........................... | 166/363 |

* cited by examiner

*Primary Examiner* — Matthew Buck
*Assistant Examiner* — Aaron Lembo
(74) *Attorney, Agent, or Firm* — The Law Firm of Andrea Hence Evans, LLC

(57) ABSTRACT

The invention features an encapsulating device and system to contain a fluid or substance spilled during a blowout of a pipe at subsea level. The system features a semi-circular housing that fits underneath the flange of a pipe. A heater is provided inside the housing. The system features a tri-flange system having flanges on the top and sides of the housing. The side flanges are closed and sealed and then the top flange is closed. Side flanges divert pressure in the system. The system discloses arms and sealants to aid in sealing the pipe.

14 Claims, 8 Drawing Sheets

ENCAPSULATING DEVICE

FIELD OF THE INVENTION

The present invention relates in general to an encapsulating device and tri-flange system operational at depths below deep sea level which can be fitted on an existing well head flange to cap a live uncontrolled blowout and become a new staging flange for a new blowout preventer.

BACKGROUND OF THE INVENTION

Blowouts are the uncontrolled release of crude oil and/or natural gas from an oil well or gas well after pressure control systems have failed. Subsea wells have the wellhead and pressure control equipment located on the seabed. They vary from depths of 10 feet (3.0 m) to 8,000 feet (2,400 m). It is difficult to deal with a blowout in very deep water because of the remoteness and limited experience of researchers and scientists with this type of situation.

Oil or gas spills from blowouts cause extensive damage to marine and wildlife habitats as well as the fishing and tourism industries of the areas surrounding the spill. Skimmer ships, floating containment booms, anchored barriers, and sand-filled barricades along shorelines have been used in an attempt to protect hundreds of miles of beaches, wetlands and estuaries from the spreading oil. During a recent oil spill, it was estimated that 53,000 barrels per day (8,400 m³/d) were escaping from the well just before it was capped after three months.

SUMMARY OF THE INVENTION

This invention introduces an encapsulating device and staging flange system for controlling and stopping the flow of a spilled substance during a pipe blowout or emergency situation.

An aspect of an embodiment of the invention provides a housing having a top, a bottom and a first and second half, wherein the first and second half each have semi-circular cutouts which form a top circular opening and a bottom circular opening on the top and the bottom of the housing, respectively.

A further aspect of an embodiment of the invention provides a tri-flange system having a top flange, a first side flange and a second side flange, whereby the first and second side flanges diverts the pressure and fluid volume in the system to allow the top flange to be secured during a pipe blowout.

Additional aspects, objectives, features and advantages of the present invention will become apparent from the following description of the preferred embodiments with reference to the attached drawings.

DETAILED DESCRIPTION OF THE INVENTION

Figure 1:
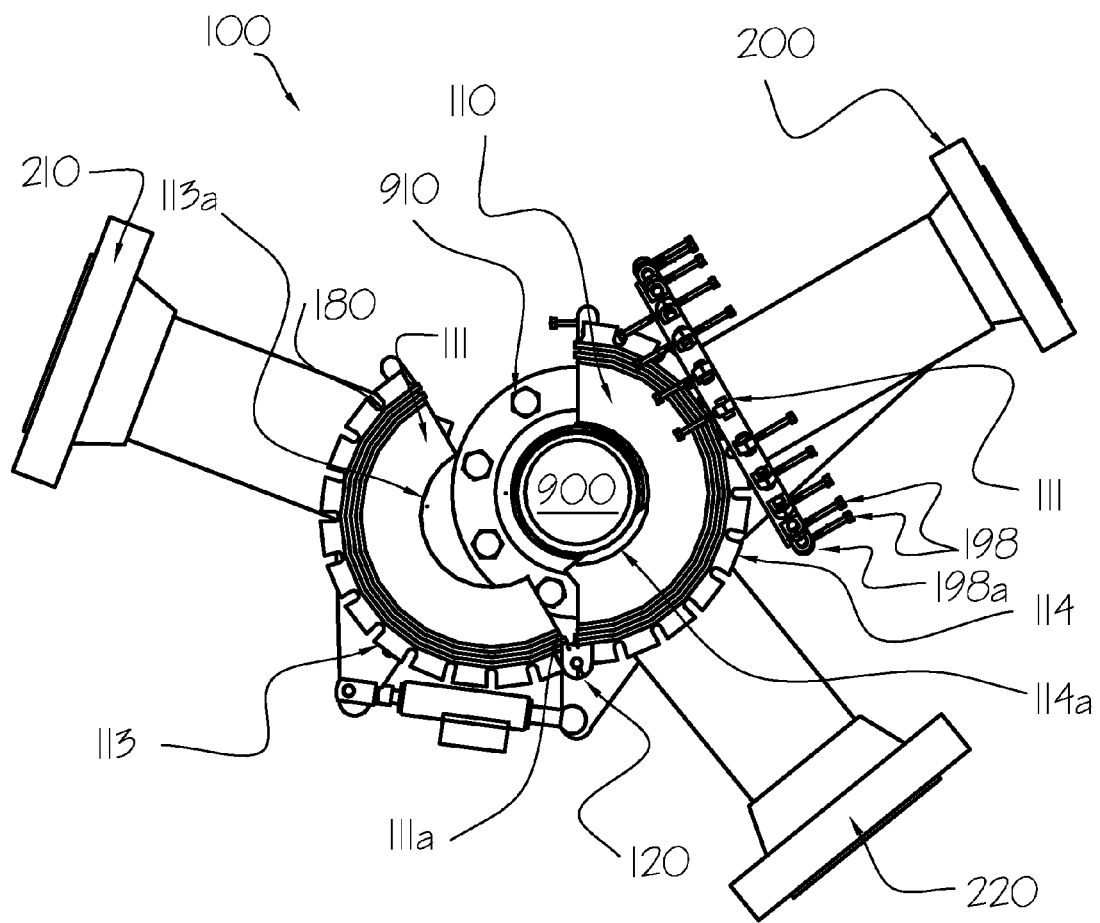
FIG. 1 is a perspective top view of the encapsulating device in an open position.
Figure 5:
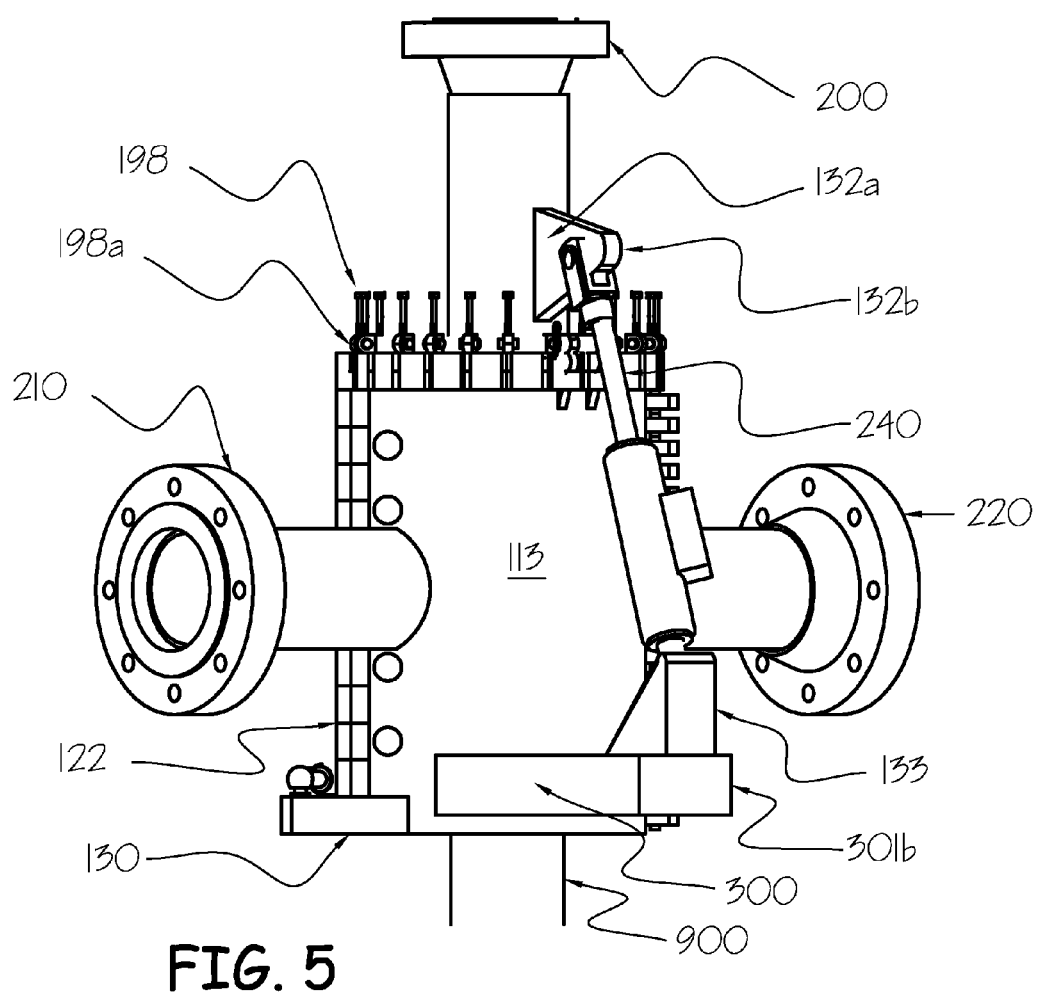
FIG. 5 is a perspective view of the right side of the encapsulating device.
Figure 6:
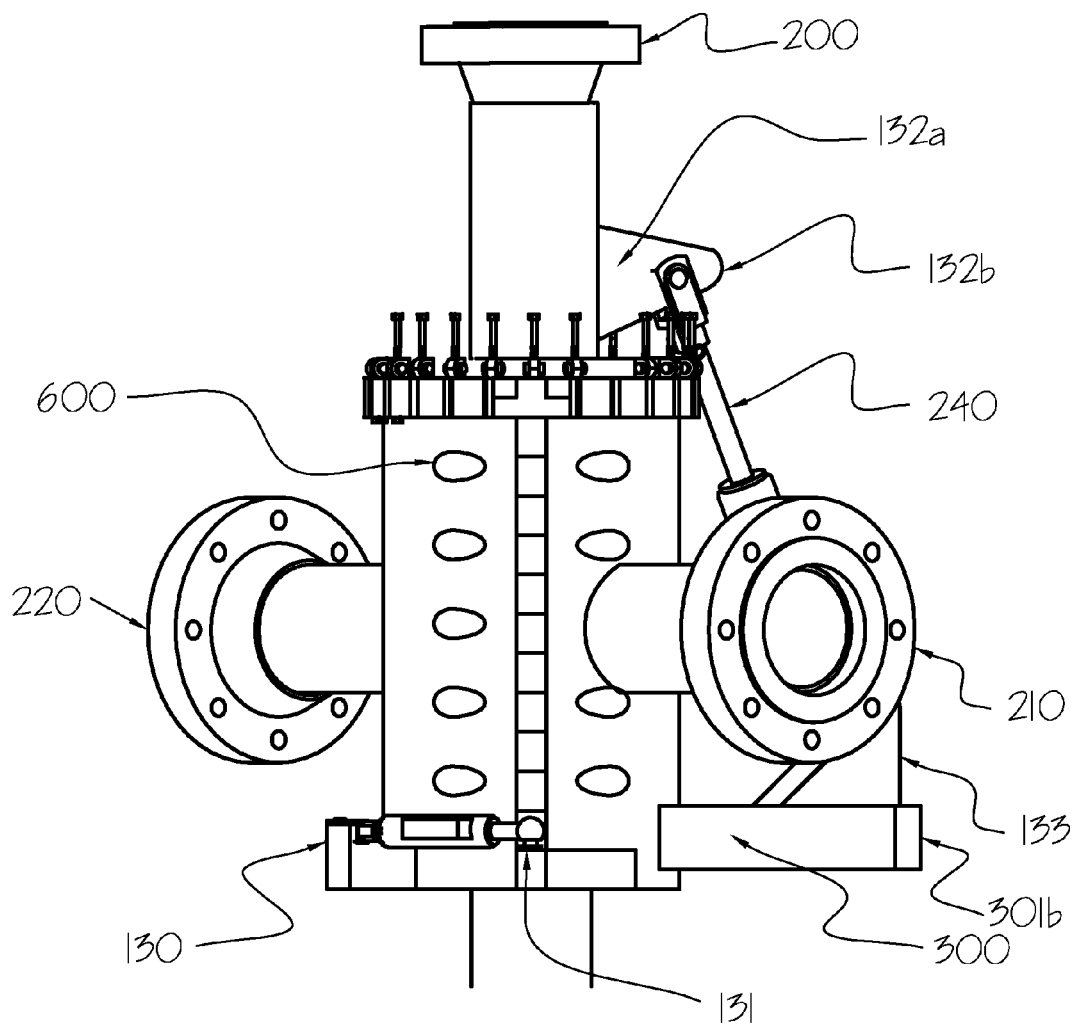
FIG. 6 is a front view of the encapsulating device in a closed position.
Figure 7:
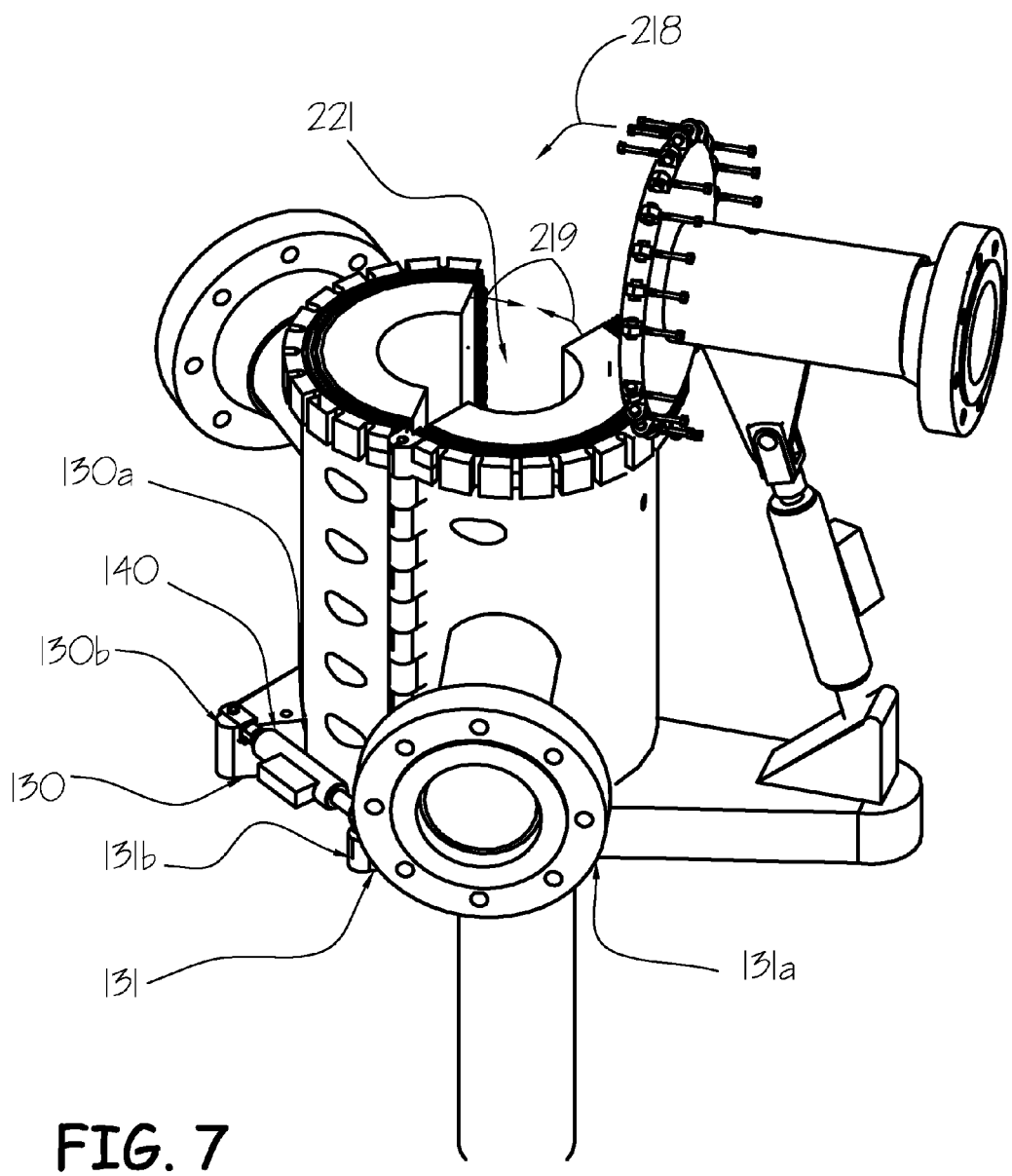
FIG. 7 is an isometric view of the encapsulating device in an open position.

FIG. 1 is a perspective top view of the encapsulating device 100 in an open position. In the event of a pipe blowout, the device 100 can contain a spilled substance and seal the pipe. The device 100 has a housing 110 having a top 111, a bottom 112 and a first 113 and second half 114. The housing 110 is in a cylindrical shape; however, it is understood that the shape of the housing can vary so long as the shape can fit around the pipe. The first and second halves 113, 114 each have semi-circular cutouts 113a, 114a, respectively which form a top circular opening 115 and a bottom circular opening 116 on the top 111 and the bottom 112 of the housing 110, respectively. The halves 113, 114 rotate about a hinge 120. The hinge 120 is located on the front side of the housing 110, as shown in FIG. 6. The hinge 120 spans the entire length of the housing 110 and protrudes outward from the housing 110. The top 121 of the hinge 120 is aligned with the top edge 111a of the top 111 of the housing 110. The hinge 120 divides the halves 113, 114 such that they are symmetrical about the hinge 120. The bottom 122 of the hinge 120 is positioned between the space between a first extension 130 and a second extension 131, as shown in FIG. 7 and FIG. 5. FIG. 5 is a perspective view of the right side of the encapsulating device.

The first extension 130 is connected to the first half 113 of the housing and the second extension 131 is connected to the second half 114 of the housing. The extensions 130, 131 are identical in size and shape and function. The extensions 130, 131 are in a triangular type shape. The back portion 130a of extension 130 and back portion 131a of extension 131 are rounded so they attach and fit smoothly around the bottom curved edges of housing 110. The front portion 130b, 131b extends outward from the bottom of the housing 110. Attachment mechanisms are secured to the front portions 130b, 131b and an arm 140 is attached to the attachment mechanisms. The arm 140 spans between the extensions 130, 131. The arm 140 controls the movement of the first and second halves 113, 114 from an open and close position. An electrical and hydraulic system controls the arm 140. In an open position, the housing 110 is open around the pipe 900 such that the pipe is not concealed.

Figure 2:
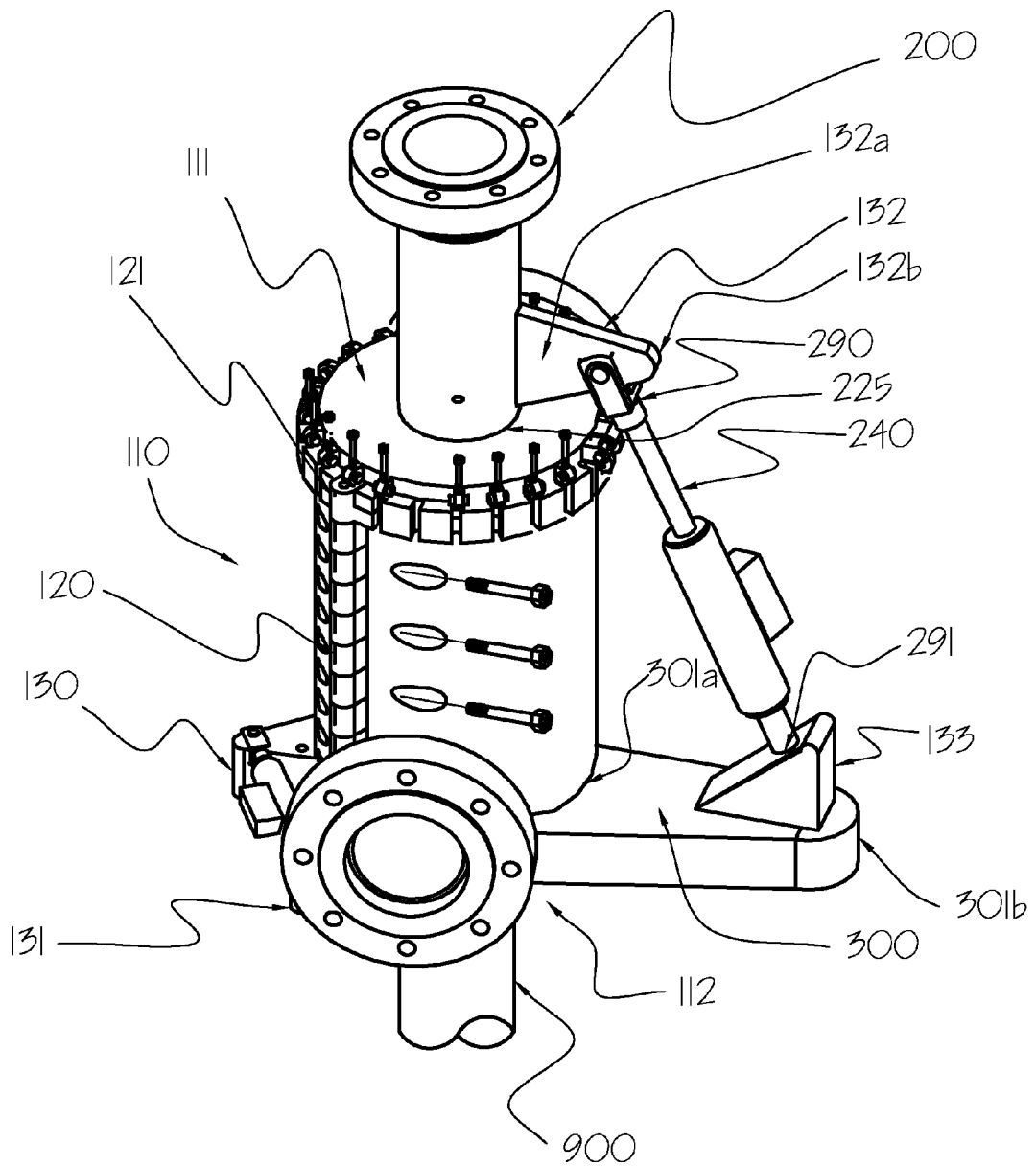
FIG. 2 is an isometric view of the encapsulating device in a closed position.
Figure 3:
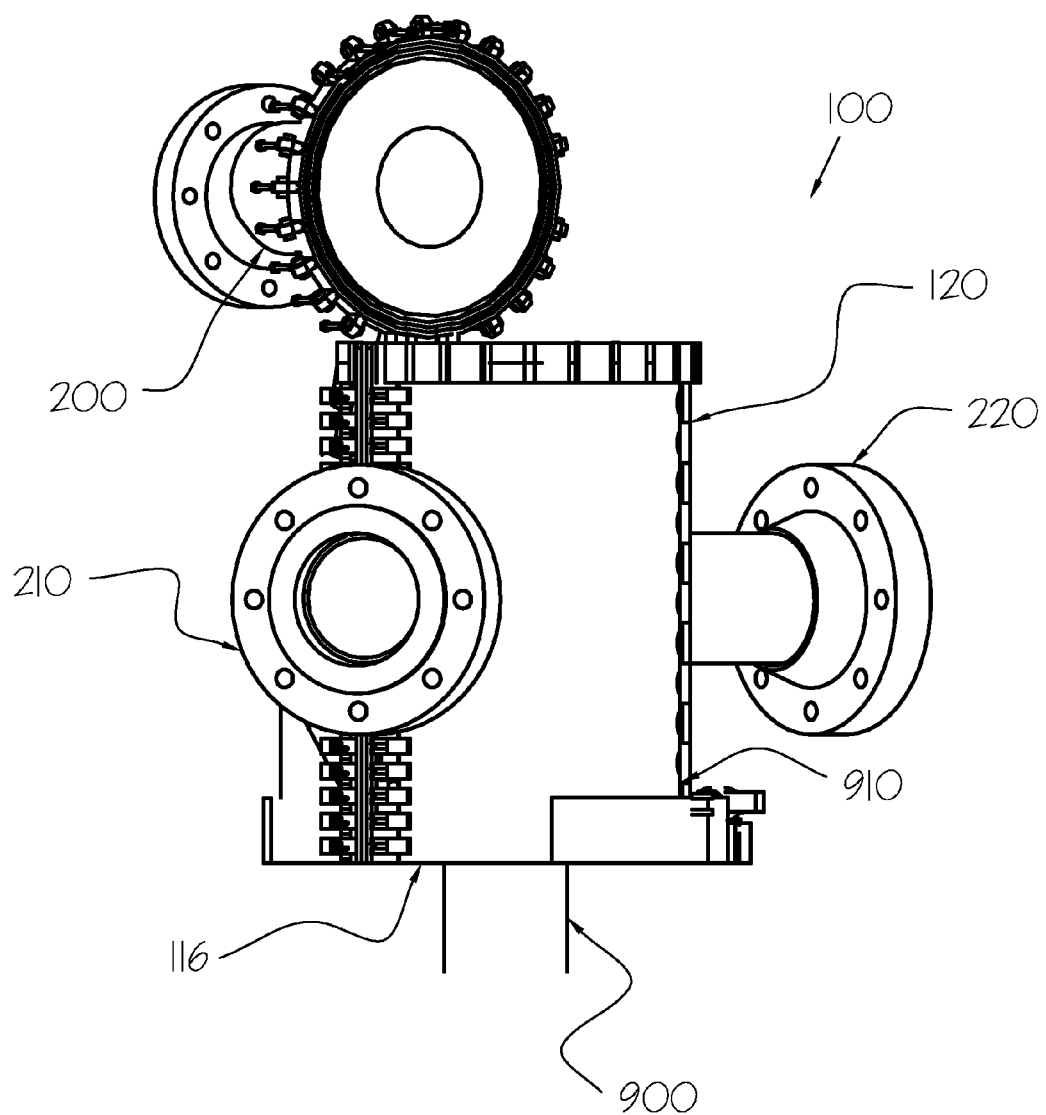
FIG. 3 is a perspective view of the left side of the encapsulating device.

FIG. 2 is an isometric view of the encapsulating device 110 in a closed position. In a closed position, the housing's halves cutouts 113a and 114a are brought together in a direction 219 to form a circular opening 221 and a top flange 200 and lid 201 are moved in a downward direction 218 to cover the circular opening 221. The housing 110 features a tri-flange system comprising a top flange 200, a first side flange 210 and a second side flange 220. The top flange 200 extends over the top circular opening 221 of the housing 110 and the first side flange 210 and the second side flange 220 extend from the first 113 and second half 114 respectively. The flanges 200, 210, and 220 are strong and durable and are used for attaching the housing to valves which may be used to control the flow of substance in and out of the flanges 200, 210, 220 When attached to the valves, the device 100 allows controlled volumes of fluid such as the spilled substance to be withdrawn from the blown out pipe. When valves are attached, the device 100 allows controlled fluid flow and shut off capabilities after which a new blowout preventer can be attached. The first side flange 210 and the second side flange 220 relieve a pressure in the housing 100 from the spilled substance. The first and second valves may be secured to the first side flange 210 and the second side flange 220. The first and second valves are used to divert pressures only during assembly of the top flange 200 and the attached valve assembly. After the top valve is assembled and bolted, the two side attached valves are then closed simultaneously. After the side valves are closed, the top valve may now be closed. Pressure is relieved by diverting the flow of the fluid during application of the device 100 onto the pipe in an open position. The first side flange 210 and the second side flange 220 extend inside the housing, as shown in FIG. 3. The first and second valves must close simultaneously to avoid tilting from offset pressures. FIG. 3 is a perspective view of the left side of the encapsulating device 100. The side flanges 210, 220 are aligned when the device is in a closed position.

The top flange 200 is attached to a lid 201. The lid 201 has a lid opening 225. The bottom of the top flange 200 is positioned through the opening 225 such that the lid 201 is secured to the top flange 200. In a closed position, the top flange 200 is attached to the lid opening 225 such that the lid 201 covers the top circular opening 221.

Figure 4:
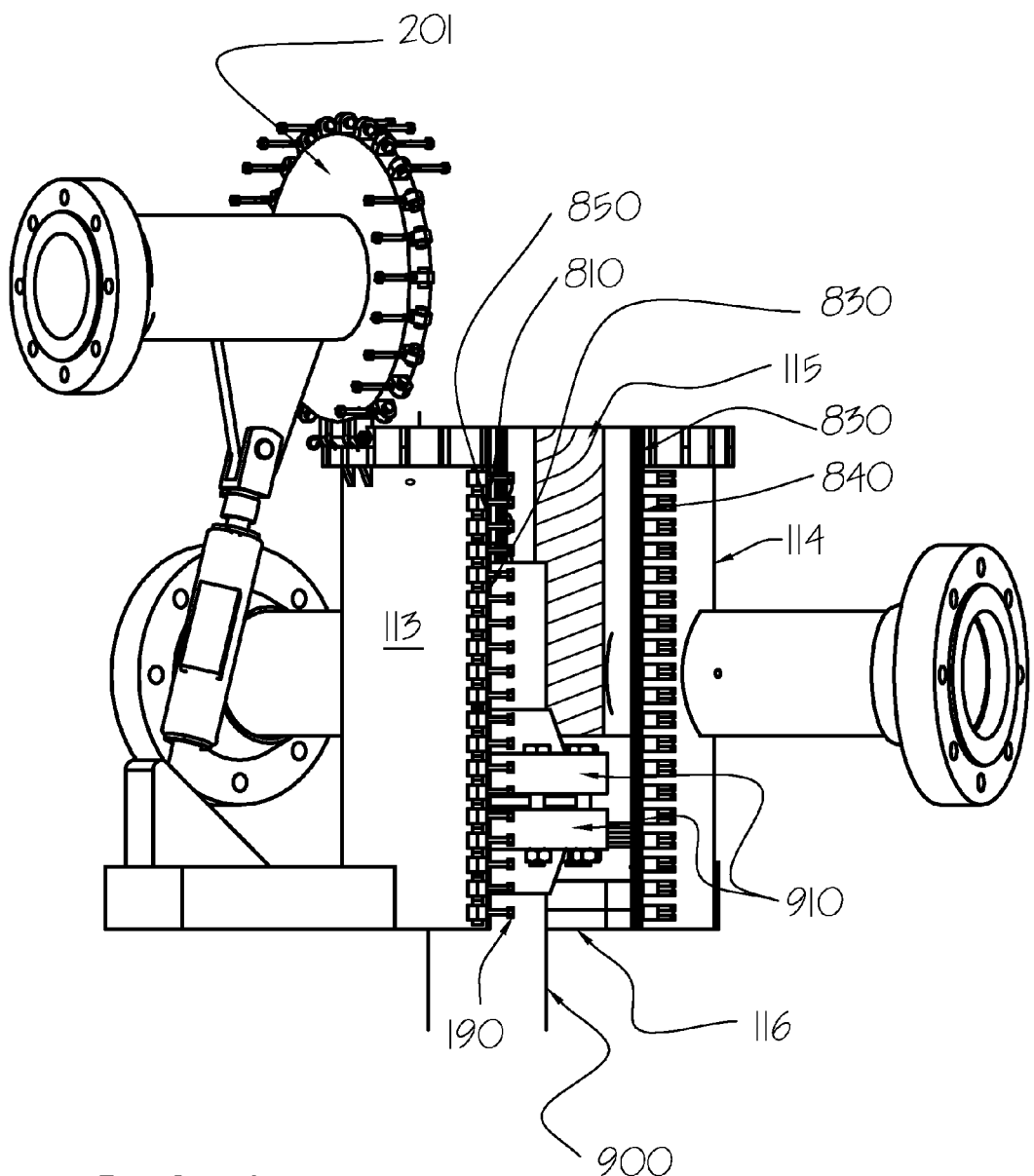
FIG. 4 is a perspective back view of the encapsulating device in an open position.

A third extension 132 is connected to the top flange 200. The third extension 130, 132 is in a triangular type shape and is secured to a side of the top flange 200. The back portion 132a of extension 132 is straight so it attaches and fit smoothly on the side of the top flange 200. The front portion 132b extends outward from the side of the top flange 200. An attachment mechanism 290 is secured to the front portion 132b of the extension 132. The attachment mechanism 290 may be a hinged bracket, as shown; however, alternate attachment mechanisms may be used so long as they are durable and can withstand frigid temperatures. An arm 240 is attached to the attachment mechanism 290 and extends from the extension 132 to a ledge extension 133. The arm 240 controls the movement of the top valve 200 and connected lid 201 from an open and close position. An electrical and hydraulic control system controls the arm 240. The control system is operated remotely from a surface ship, for example, via a tether line and direct wire control. Mechanical applications such as positioning and tightening bolts and positioning of the device at the wellhead may use a remote operating vehicle or similar device to accomplish these tasks. The housing 110 further comprises a ledge 300 extending from the bottom 112 of the housing 110. The ledge extension 133 sits on the top portion of the ledge 300. The ledge 300 is also in a triangular type shape having a back portion 301a that is curved so that it can make direct contact with a curved side of the housing 110. The ledge extension 133 sits on the front portion 301b of the ledge 300. The ledge extension 133 is an obtuse triangular shape and features an aperture 291 that receives a bottom portion of arm 240. The arm 240 extends from the ledge extension 133 to the attachment mechanism 290 which is attached to extension 132. FIG. 4 is a perspective back view of the encapsulating device in an open position.

The top 111 of the housing 110 has an edge 111a that has recess portions 180. The recess portions 180 are evenly spaced openings around the top edges of the halves 113 and 114 that receive pins 198 positioned through the lid 201. The lid 201 features apertures 198a sized to receive the body of the pins. When the top valve 200 and lid 201 are in a closed position, the pins 198 are aligned with the recessed openings 180. The pins 198 add an extra secure seal between the top valve 200 and attached lid 201 since the pins may be tightened to ensure proper closure. Pins 198 are hinged and drop down into a position with tightening nuts attached prior to submersion with an assistance of a ROV at subsea level to secure and tighten to torque specifications. The recessed portions 180 are symmetrical on each of the halves 113, 114. When closed, the pins 198 are positioned along the first and second half 113, 114 of the housing 100 and the lid 201.

FIG. 6 is a front view of the encapsulating device 100 in a closed position. Inside the housing are heaters in the form of heating tubes 600. Heating tubes 600 are aligned symmetrically in each half 113, 114. The heaters 600 span from the top of the inside housing to the bottom. They are positioned inside the housing where they will not intrude on the pipe fittings inside of the housing, when closed. The heaters 600 have sensors that sense or detect the temperature and can raise or lower the temperature to an appropriate temperature to ensure there is no freezing of the spilled substance captured inside of the housing and also to keep the device at a proper functioning temperature. The heaters 600 are positioned near the front inside housing 110. The heaters may be heating tubes in the form of electric coils. Heating coils follow the cylindrical sections of the interior of the device, both halves. The coils do not impede the egress portions of the device, such as the side relief ports. The coils will extend from the bottom of the center chamber to the top of the device interior.

FIG. 3 is a perspective view of the left side of the encapsulating device 100. The device 100 is secured underneath the pipe's flange 910. Specifically, the bottom circular opening 116 of the housing 110 is positioned underneath the pipe flange 910. The device 100 can fit over and under an existing flange. The existing flange works as a locking device and guide and allows minimum movement of up or down motion during the application and closing of the lower half sections. The lower half of the encapsulating device will be sealed against the surface of the flange and the surface of the main pipe.

Figure 8:
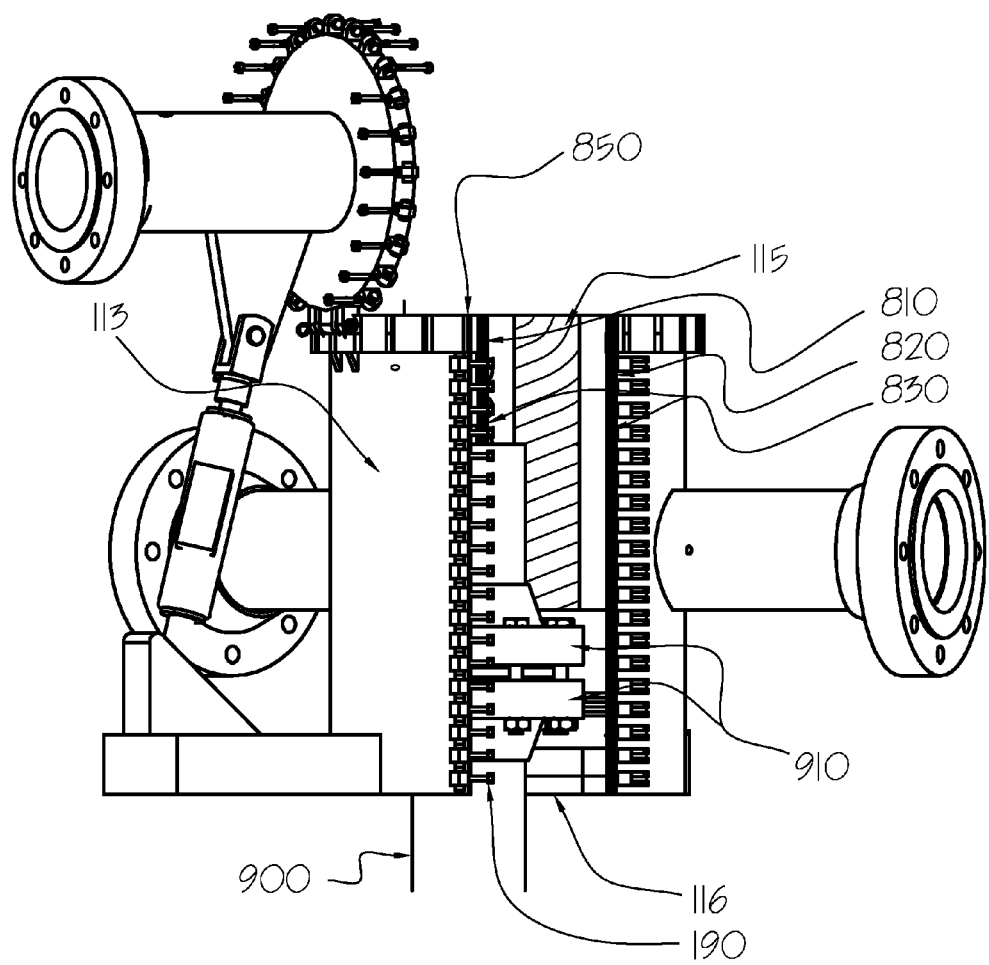
FIG. 8 is a view of the side edges of the first and second half of the housing of a preferred embodiment of the invention.

FIG. 8 is a view of the side edges 810, 820 of the first and second half 113, 114 of the housing 110 of a preferred embodiment of the invention. The first half 113 of the housing comprises a first half edge 810 featuring spaced sealants 830. The sealants 820 are evenly spaced along the edge 810 of the half 113. The sealants 830 are preferably steel sealants that that receive edge extensions 840 on a second half edge 114. The sealants 830 deform when the device is closed. The force of the edge extensions 840, when closed, on the sealants causes the sealants 830 to contact an inner edge 850 of the first half 113. The steel sealants 830 provide extra sealing of the device where the first and second halves 113, 114 meet when closed. Additionally, pins are positioned along the edges of the half 113 such that the pins can be received and secured to the receivers 915 on the second half 114. The sealants 830 are to be of a malleable material such as steel or coated copper, for example. The sealants resist any corrosive actions and are deformable or crushable to marry two dissimilar surfaces such as rough casting or irregular pipe sizing due to corrosion or manufacture.

The device 100 can be used at subsea levels during a blowout of a pipe 900. The bottom 116 of the device 100 is positioned underneath a pipe flange 910 on the pipe 900. The first half 113 is moved towards the second half 114 to close the sides of the housing 100. When closed, the semi-cut portions 113a, 114a of the halves from a top circular opening 115 and a bottom circular opening 116. It is imperative that the sides 113, 114 are closed prior to the closing of the top flange 200 and lid 201 so that the side valves 210, 211 may divert the pressure inside the housing when the first and second halves are closing. Side flanges divert pressures during application of the top section installation and positioning. The device 100 prevents the uncontrolled release of gas, oil or spilled substance from the pipe during a blowout. The device 100 will stop the flow or release of gas or oil from a blowout or an event that leaves a pipeline open and uncontrollable and forms a new flange system. The device remains on the pipe until A BOP assembly or other flange device is connected. The device 100 shortens the period of time that an uncontrolled line stays open, therefore, saving the fluid from entering the seas and giving a new platform to install another BOP.

The invention has been described in detail with particular reference to certain preferred embodiments thereof, but it will be understood that variations and modifications can be effected within the spirit and scope of the invention.

The invention claimed is:

1. An encapsulating device for containing a spilled substance during a pipe blowout comprising:
    a housing comprising a top, a bottom and a first and second half;
    wherein the first and second half each have semi-circular cutouts which form a top circular opening and a bottom circular opening on the top and the bottom of the housing, respectively; and
    a tri-flange system comprising a top flange, a first side flange and a second side flange;
    wherein the top flange extends over the top circular opening of the housing and the first side flange and the second side flange extend from the first and second half respectively;
    wherein the housing further comprises a ledge extending from the housing,
    wherein the ledge features a first arm operably connected to the top flange,
    wherein the first side flange and the second side flange relieves a pressure in the housing from the spilled substance.

2. The encapsulating device of claim 1, further comprises a lid having a lid opening, wherein the top flange is attached to the lid opening such that the lid covers the top circular opening.

3. The encapsulating device of claim 1, wherein the first arm moves the lid and the top flange in an open and closed position.

4. The encapsulating device of claim 1, wherein the top of the housing comprises an edge featuring spaced openings that receive pins positioned through the lid.

5. The encapsulating device of claim 3, wherein the housing further comprises a first extension connected to the first half and a second extension connected to the second half; wherein a second arm is positioned between the first extension and second extension to open and close the first and second half of the housing.

6. The encapsulating device of claim 1 further comprising heaters inside the housing, wherein the heaters provide a temperature to ensure there is no freezing.

7. The encapsulating device of claim 1, wherein the pipe features a pipe flange such that the bottom circular opening of the housing is positioned underneath the pipe flange.

8. The encapsulating device of claim 5, wherein the first half of the housing comprises a first half edge featuring spaced sealants that receive extensions on a second half edge, wherein the sealants deform to contact an inner edge of the first half.

9. An encapsulating device for containing a spilled substance during a pipe blowout comprising:
    a housing comprising a top, a bottom and a first and second half;
    wherein the first and second half each have semi-circular cutouts which form a top circular opening and a bottom circular opening on the top and the bottom of the housing, respectively; and
    a tri-flange system comprising a top flange, a first side flange and a second side flange;
    wherein the housing fits around a pipe flange portion of the pipe;
    wherein the housing further comprises a ledge extending from the housing,
    wherein the ledge features a first arm operably connected to the top flange,
    wherein the first and the second side flanges provide pressure diversion of the spilled substance and the top flange is aligned with the top circular opening to seal the pipe during the pipe blowout.

10. An encapsulating device of claim 9 further comprising a second arm, wherein the second arm moves the first and second half between an open and closed position.

11. An encapsulating device of claim 10 wherein the first and second half further comprise a sealant to further seal the housing.

12. An encapsulating device of claim 11 further comprising a lid wherein the top flange is attached to the lid such that the lid and top flange cover the top circular opening.

13. An encapsulating device of claim 12 wherein pins are positioned along the first and second half of the housing and the lid.

14. A method of sealing a pipe at a subsea level during a blowout of a pipe comprising:
    providing an encapsulating system comprising a housing having a top, a bottom and a first and second half;
    wherein the first and second half each have semi-circular cutouts; and
    a tri-flange system comprising a top flange, a first side flange and a second side flange;
    providing a ledge extending from the housing, wherein the ledge features a first arm operably connected to the top flange,
    positioning the encapsulating system underneath a pipe flange on the pipe;
    moving the first and second half to a closed position to form a top circular opening and a bottom circular opening on the top and the bottom of the housing, respectively;
    wherein the first side flange and the second side flange extend from the first and second half, respectively, and the first and second side flange diverts the pressure inside the housing when the first and second halves are closing;
    positioning the top flange over the top circular opening; and
    sealing the system to contain a fluid or substance spilled during a blowout.

\* \* \* \* \*